(12) United States Patent
Yamamoto et al.

(10) Patent No.: US 7,651,274 B2
(45) Date of Patent: Jan. 26, 2010

(54) SPHERICAL SLIDE BEARING SYSTEM

(75) Inventors: Hiroshi Yamamoto, Hiratsuka (JP); Yasunori Sato, Hiratsuka (JP); Ryuusuke Komura, Hiratsuka (JP); Tatsuo Aira, Hirakata (JP); Akinobu Iwasaki, Hirakata (JP)

(73) Assignee: Komatsu Ltd., Tokyo (JP)

( * ) Notice: Subject to any disclaimer, the term of this patent is extended or adjusted under 35 U.S.C. 154(b) by 390 days.

(21) Appl. No.: 11/658,064

(22) PCT Filed: Jul. 20, 2005

(86) PCT No.: PCT/JP2005/013320

§ 371 (c)(1),
(2), (4) Date: Jan. 19, 2007

(87) PCT Pub. No.: WO2006/009175

PCT Pub. Date: Jan. 26, 2006

(65) Prior Publication Data

US 2008/0089627 A1    Apr. 17, 2008

(30) Foreign Application Priority Data

Jul. 20, 2004    (JP)    ............................. 2004-211911

(51) Int. Cl.
  F16C 23/02    (2006.01)
  F16C 33/10    (2006.01)
  F16C 33/74    (2006.01)
(52) U.S. Cl. .................. 384/473; 384/203; 384/213
(58) Field of Classification Search .................. 384/99, 384/146–147, 203, 209–210, 213, 206, 473–474; 403/39, 113, 122–123, 131; 29/898.031, 29/898.043
See application file for complete search history.

(56) References Cited

U.S. PATENT DOCUMENTS 2,974,986 A    3/1961    Hazard (Continued)

FOREIGN PATENT DOCUMENTS

DE    1 869 890 U    4/1963

(Continued)

OTHER PUBLICATIONS

Notification Concerning Transmittal of International Preliminary Report on Patentability, Chapter I of the Patent Cooperation Treaty, and Written Opinion of the International Searching Authority, dated Jan. 23, 2007, for PCT/JP2005/013320, 5 sheets.

(Continued)

Primary Examiner—Marcus Charles
(74) Attorney, Agent, or Firm—Frishauf, Holtz, Goodman & Chick, P.C.

(57) ABSTRACT

A spherical slide bearing has an outer ring and an inner ring slidably retained within the outer ring. A pin having a grease supply flow path extending through an interior thereof to open in an outer peripheral surface thereof is inserted into the inner ring so that the pin is circumferentially slidable, with the inner ring being equipped with a communication flow path establishing communication between a gap defined between the inner ring and the pin and a gap defined between the inner ring and the outer ring. The inlet port of the communication flow path is provided at a position where grease having flown out of an outlet port of the grease supply flow path flows after having flown through the gap between the pin and the inner ring substantially through the entire length in the axial direction of the pin.

12 Claims, 10 Drawing Sheets

U.S. PATENT DOCUMENTS

| | | | | |
|---|---|---|---|---|
| 3,243,212 | A * | 3/1966 | May | 384/203 |
| 3,379,464 | A * | 4/1968 | Bradshaw | 403/39 |
| 3,588,201 | A * | 6/1971 | Schmidt | 384/146 |
| 3,683,474 | A * | 8/1972 | Young, Jr. | 29/898.043 |
| 3,947,075 | A * | 3/1976 | Ewertz | 384/210 |
| 4,080,013 | A * | 3/1978 | Koch | 384/145 |
| 4,080,015 | A * | 3/1978 | Greby et al. | 384/206 |
| 4,213,512 | A | 7/1980 | Mazziotti | |
| 4,858,962 | A * | 8/1989 | Bolling et al. | 403/39 |
| 5,435,652 | A * | 7/1995 | Howard | 384/99 |
| 5,573,336 | A * | 11/1996 | Maroney | 384/146 |
| 6,626,575 | B2 | 9/2003 | Hartl | |
| 6,739,786 | B2 * | 5/2004 | Reniau | 403/39 |

FOREIGN PATENT DOCUMENTS

| | | |
|---|---|---|
| DE | 36 08 782 A1 | 9/1987 |
| JP | 63-130676 | 8/1988 |
| JP | 2-114223 | 9/1990 |
| JP | 8-218418 A | 8/1996 |
| JP | 9-158529 A | 6/1997 |
| JP | 09-177786 A | 7/1997 |
| JP | 10-141354 A | 5/1998 |
| JP | 11-82493 A | 3/1999 |

OTHER PUBLICATIONS

German Office Action dated Jan. 28, 2009 (3 pages), and English translation thereof (2 pages) issued in counterpart German Application No. 11 2005 001 719.2-12.

* cited by examiner

SPHERICAL SLIDE BEARING SYSTEM

TECHNICAL FIELD

This application is a U.S. National Phase Application under 35 USC 371 of International Application PCT/JP2005/013320 filed Jul. 20, 2005.

The present invention relates to a spherical slide bearing system in which a pin is slidably inserted into an inner ring.

BACKGROUND ART

Conventionally, in construction equipment, a hydraulic cylinder and other structures are connected to a frame or the like through pin connection. When performing pin connection, particularly in large construction equipment, a spherical slide bearing system is used (JP10-141354).

A spherical slide bearing is equipped with an annular outer bearing, and an inner ring that is also formed in an annular configuration and slidably fitted into the outer ring; a pin is inserted into the inner ring, and is fixed to a frame.

In a large spherical slide bearing system as used in construction equipment, sliding is caused between the outer ring and the inner ring so as to allow rotational motion in an arbitrary direction; further, circumferential sliding is also caused between the inner ring and the pin. This is because there is provided a predetermined gap between the inner ring and the pin to thereby facilitate the insertion of the pin into the inner ring and to achieve an improvement in terms of the ease with which the pin, which is a heavy component, is incorporated.

When sliding is to be effected in two gap portions as between the outer ring and the inner ring and between the inner ring and the pin, it is necessary to supply grease to both of the two gap portions. As a grease supply line, a construction is available in which grease is supplied from the outer side of the outer ring as disclosed in the above-mentioned patent document; apart from this, depending upon the condition under which the spherical bearing is provided, there is also available a construction in which grease is supplied through the interior of the pin.

In the construction in which grease is supplied through the interior of the pin, grease is first discharged from a grease supply flow path providing communication between the interior of the pin and the outer peripheral surface thereof to supply grease to the gap between the pin and the inner ring, from which grease is further guided for supply to the gap between the inner ring and the outer ring through a communication flow path provided in the inner ring, whereby the two gap portions are filled with grease to effect lubrication between the sliding surfaces.

It should be noted, however, that, in the construction in which grease is supplied through the interior of the pin, the gap between the inner and outer rings is larger than the gap between the pin and the inner ring due to the construction. Thus, while at the early stage of grease supply both gaps are uniformly filled with grease, in the subsequent grease supply for supplementing grease, more grease is supplied to the gap involving less flow path resistance, that is, to the larger gap between the inner and outer rings.

When this state is allowed to continue, the amount of grease supplied to the smaller gap between the pin and the inner ring decreases, so that the lubrication of this portion ceases to be effected in a satisfactory manner, and the sliding surfaces are heated to promote a deterioration in the grease. As a result, deteriorated solid grease can be allowed to enter the communication flow path for guiding grease to the gap between the inner and outer rings; this will cause clogging in the communication flow path, thereby making it impossible to effect grease supply to the gap between the inner and outer rings in a satisfactory manner; thus, the bearing as a whole will be heated to cause seizure, resulting in breakage of the inner ring.

It is an object of the present invention to provide a spherical slide bearing system in which it is possible to reliably prevent seizure even in a construction in which grease is supplied through the interior of a pin, thereby achieving an improvement in terms of durability.

SUMMARY OF THE INVENTION

A spherical slide bearing system according to a first invention includes an outer ring, and an inner ring slidably retained within the outer ring. In the bearing system, a pin (shaft) having a grease supply flow path extending through an interior thereof to open in an outer peripheral surface thereof is inserted into the inner ring so that the pin is circumferentially slidable, with the inner ring being equipped with a communication flow path establishing communication between a gap defined between the inner ring and the pin and a gap defined between the inner ring and the outer ring; and an inlet port (provided on pin side) of the communication flow path is provided at a position where grease having flown out of an outlet port of the grease supply flow path flows into after having flown through the gap between the pin and the inner ring substantially through the entire length in an axial direction of the pin.

According to a second invention, in the spherical slide bearing system according to the first invention, at both ends of the gap between the pin and the inner ring with respect to the axial direction of the pin, there are provided leakage suppressing devices for suppressing leakage of grease from the gap.

According to a third invention, in the spherical slide bearing system according to the first or the second invention, a circumferentially continuous groove is provided at a portion of an inner peripheral surface of the inner ring corresponding to the outlet port of the grease supply flow path.

According to a fourth invention, in the spherical slide bearing system according to any one of the first through the third inventions, an outlet port of the communication flow path is provided substantially at a central portion of the outer peripheral surface of the inner ring with respect to a width direction thereof along the axial direction of the pin.

According to a fifth invention, in the spherical slide bearing system according to any one of the first through the fourth inventions, the outlet port of the grease supply flow path is provided at a plurality of positions in the vicinity of both ends in a width direction of the inner ring along the axial direction of the pin and within the width of the inner ring so that the outlet port of the grease supply flow path is substantially symmetrical with respect to a center in the width direction; and the inlet port of the communication flow path is provided substantially at a central portion in the width direction of the inner peripheral surface of the inner ring.

According to a sixth invention, in the spherical slide bearing system according to any one of the first through the fourth inventions, the outlet port of the grease supply flow path is provided at least one in number substantially at a central portion in a width direction of the inner ring along the axial direction of the pin; and the inlet port of the communication flow path is provided in the vicinity of both ends in the width direction of an inner peripheral surface of the inner ring.

According to a seventh invention, in the spherical slide bearing system according to any one of the first through the fourth inventions, the outlet port of the grease supply flow path is provided at least one in number at a position in the vicinity of one end in a width direction of the inner ring along the axial direction of the pin and within the width of the inner ring; and the inlet port of the communication flow path is provided in the vicinity of the other end in the width direction of the inner peripheral surface of the inner ring.

As described above, according to the first invention, the grease discharged from the outlet port of the grease supply flow path of the pin enters at the inlet port of the communication flow path provided in the inner ring from the gap between the pin and the inner ring; in this process, after flowing substantially through the entire length of the gap (length thereof as measured along the axial direction of the pin), the grease flows in at the inlet port of the communication flow path, so that the grease is sufficiently spread throughout this gap to fill the same, thereby effecting lubrication in a satisfactory manner and preventing a deterioration in the grease in the gap due to the heating of the sliding surfaces. Thus, there is no fear of the communication flow path provided in the inner ring being clogged with deteriorated grease, so that grease is spread in a satisfactory manner throughout the gap between the inner and outer rings, thereby reliably preventing seizure and achieving an improvement in terms of durability.

According to the second invention, there are provided grease leakage suppressing devices at both ends in the axial direction of the gap between the pin and the inner ring, so that the grease having passed through this gap enters without fail the communication flow path of the inner ring, thus making it possible to effect grease supply more reliably.

According to the third invention, a groove that is continuous in the circumferential direction is provided at a portion corresponding to the outlet port of the grease supply flow path, whereby grease can be spread in a more satisfactory manner over the inner peripheral surface of the inner ring through the groove, so that it is possible to prevent seizure more reliably and to achieve an improvement in terms of durability.

According to the fourth invention, the outlet port of the communication flow path is provided in the substantially central portion in the width direction of the outer peripheral surface of the inner ring, whereby it is possible for the flow of grease to be one from the inner side toward the outer side, so that it is possible to discharge deteriorated grease to the exterior, thereby making it possible to reliably prevent clogging of the communication flow path with deteriorated grease.

According to the fifth invention, the outlet port of the grease supply flow path is provided at a plurality of symmetrical positions in the vicinity of both ends in the width direction of the inner ring and within the width of the inner ring, and the inlet port of the communication flow path is provided substantially at the center in the width direction of the inner peripheral surface of the inner ring, whereby the grease flowing out of the grease supply flow path flows from the outer side toward the inner side through the gap between the inner peripheral surface of the inner ring and the outer peripheral surface of the pin, and then enters the communication flow path to be supplied to the outer ring side, so that it is possible to reliably supply grease to this gap.

According to the sixth invention, the outlet port of the grease supply flow path is provided substantially at the center in the width direction of the inner ring, and the inlet port of the communication flow path is provided in the vicinity of both ends in the width direction of the inner peripheral surface of the inner ring, whereby grease flows from the inner side toward the outer side through the gap between the inner peripheral surface of the inner ring and the outer peripheral surface of the pin, so, as in the fifth invention, it is possible to reliably supply grease to the gap between the inner peripheral surface of the inner ring and the outer peripheral surface of the pin.

According to the seventh invention, at least one outlet port of the supply grease flow path is provided at a position in the vicinity of one end in the width direction of the inner ring and within the width of the inner ring, and the inlet port of the communication flow path is provided in the vicinity of the other end in the width direction of the inner peripheral surface of the inner ring, whereby grease flows from one end toward the other end through the gap between the inner peripheral surface of the inner ring and the outer peripheral surface of the pin, so, as in the fifth invention, it is possible to reliably supply grease to the gap between the inner peripheral surface of the inner ring and the outer peripheral surface of the pin.

BRIEF DESCRIPTION OF THE DRAWINGS

FIG. [1] A perspective view of a mounting structure for a hydraulic cylinder equipped with a spherical slide bearing according to a first embodiment of the present invention.

FIG. [2] A general view of the hydraulic cylinder.

FIG. [3] A sectional view of the portion of the hydraulic cylinder where the spherical slide bearing is provided.

FIG. [4] A front view of the portion of the hydraulic cylinder where the spherical slide bearing is provided.

FIG. [5] A sectional view of the spherical slide bearing with a pin inserted therein.

FIG. [6] A general perspective view of the pin.

FIG. [7] A schematic view for illustrating the grease flow in the spherical slide bearing.

FIG. [8] A schematic view of a second embodiment of the present invention.

FIG. [9] A schematic view of a third embodiment of the present invention.

FIG. [10] A schematic view of a fourth embodiment of the present invention.

DETAILED DESCRIPTION OF THE INVENTION

10 . . . spherical slide bearing, 11 . . . outer ring, 12 . . . inner ring, 13, 15 . . . gap, 16 . . . seal functioning as a leakage suppressing device, 18 . . . communication flow path, 18a . . . inlet port, 20 . . . pin, 23 . . . grease supply flow path, 23a . . . outlet port, 36 . . . O-ring functioning as a leakage suppressing device First Embodiment In the following, an embodiment of the present invention will be described with reference to the drawings.

Figure 1:
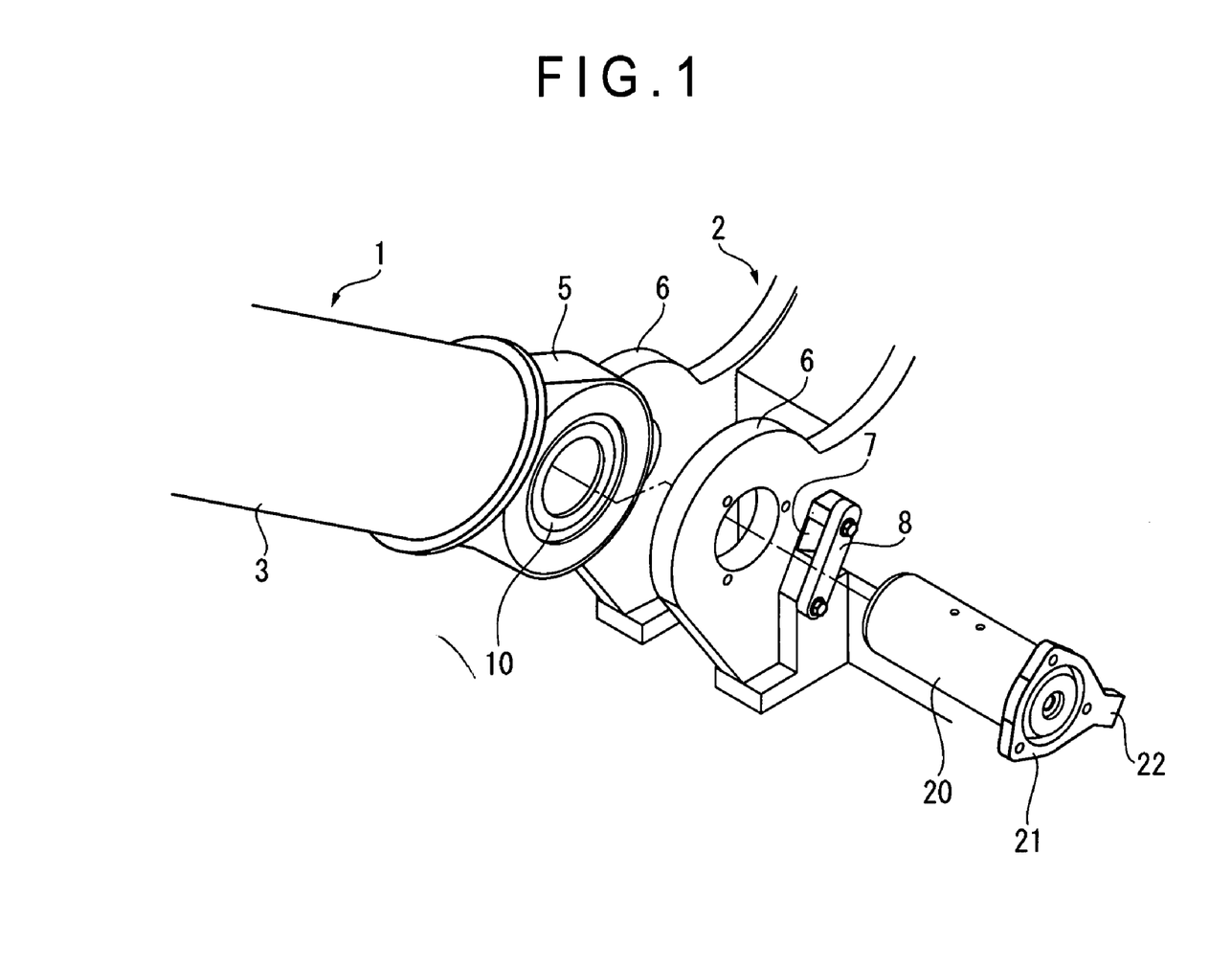
Figure 2:
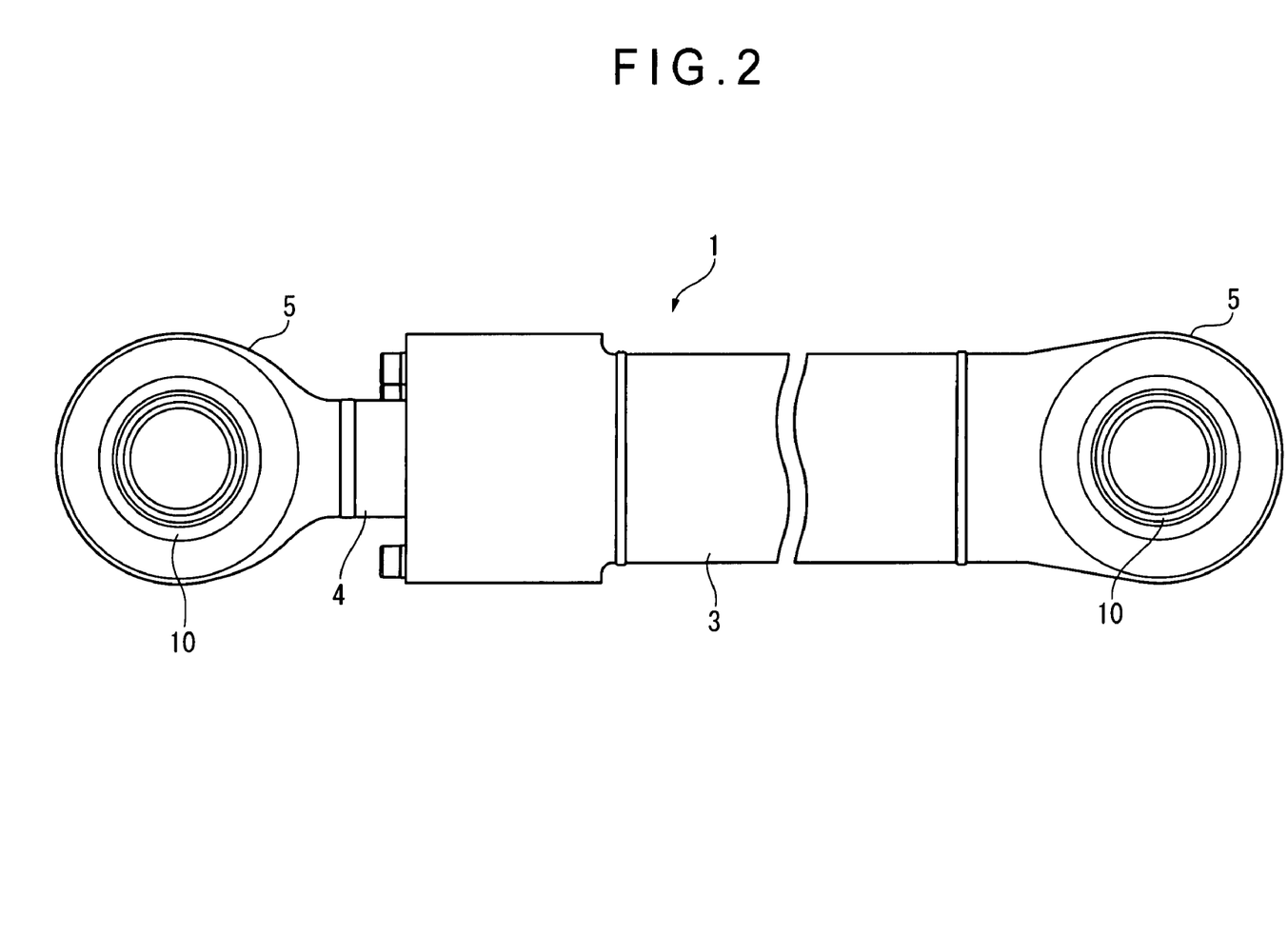

In FIGS. 1 and 2, a hydraulic cylinder 1 is for use in relatively large construction equipment (e.g., to drive the boom of a hydraulic shovel), and is equipped with a cylinder main body 3 to which oil pressure is supplied, and a rod 4 adapted to advance and retreat relative to the cylinder main body 3. Rocking side bosses 5 are respectively provided at the bottom side end of the cylinder main body 3 and at the distal end of the rod 4, with spherical slide bearings 10 being respectively incorporated into the rocking side bosses 5. Then, the cylinder main body 3 side portion is pin-connected to a vehicle frame 2 of construction equipment, and the rod 4 side portion is pin-connected to a boom or the like (not shown).

On the cylinder main body 3 side, the spherical slide bearing 10 is arranged between a pair of fixation side bosses 6 provided on the vehicle frame 2, and a pin 20, which is a columnar shaft, is passed through the fixation side bosses 6 and the spherical slide bearing 10. A flange 21 is provided at the proximal end of the pin 20, and the flange 21 and one fixation side boss 6 are fixed to each other by bolts (not shown). Further, a detent 22 is provided on the flange 21, and the detent 22 is fitted into a lock portion 7 on the vehicle frame 2 side and fixed in position by a lock member 8. Substantially the same mounting structure is adopted on the rod 4 side.

Figure 3:
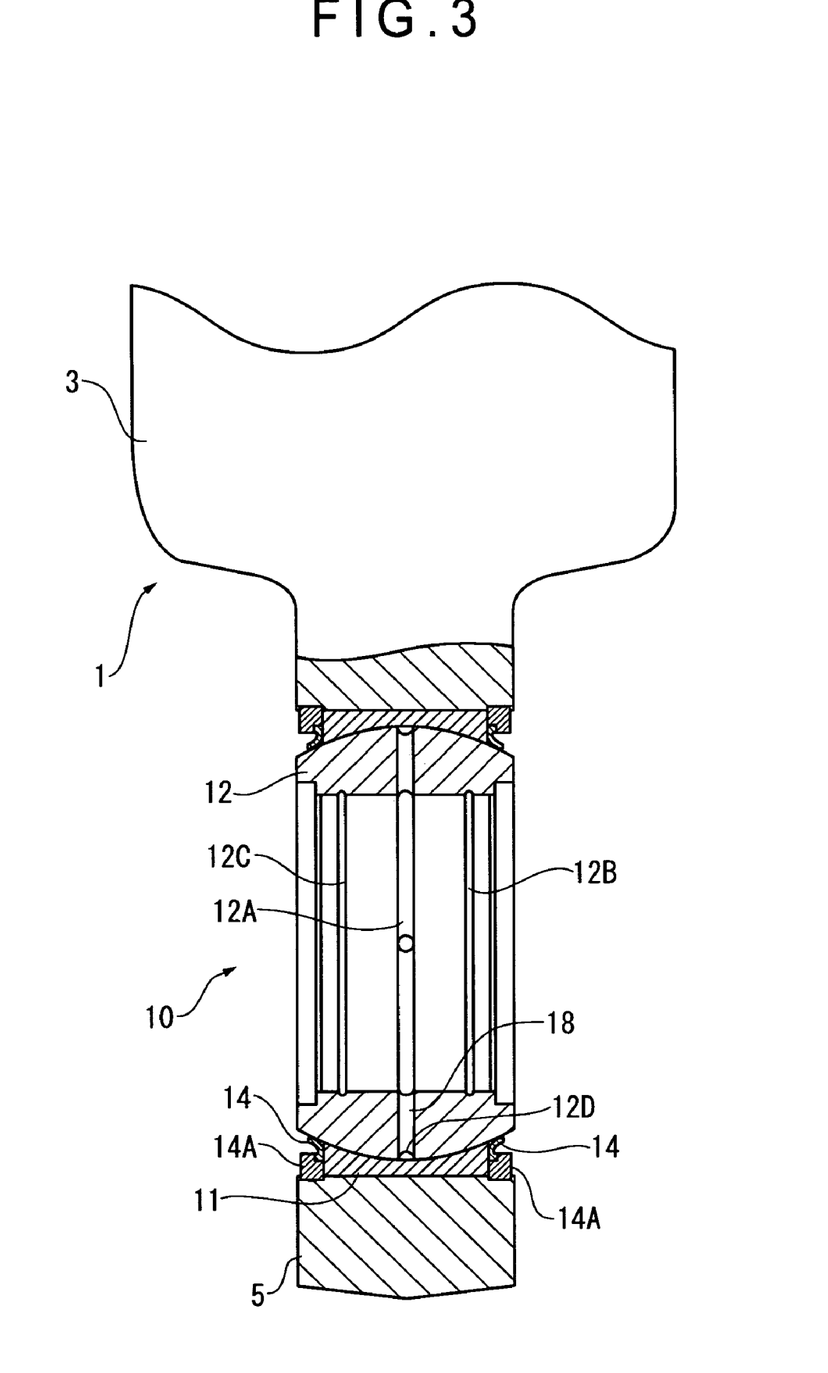
Figure 4:
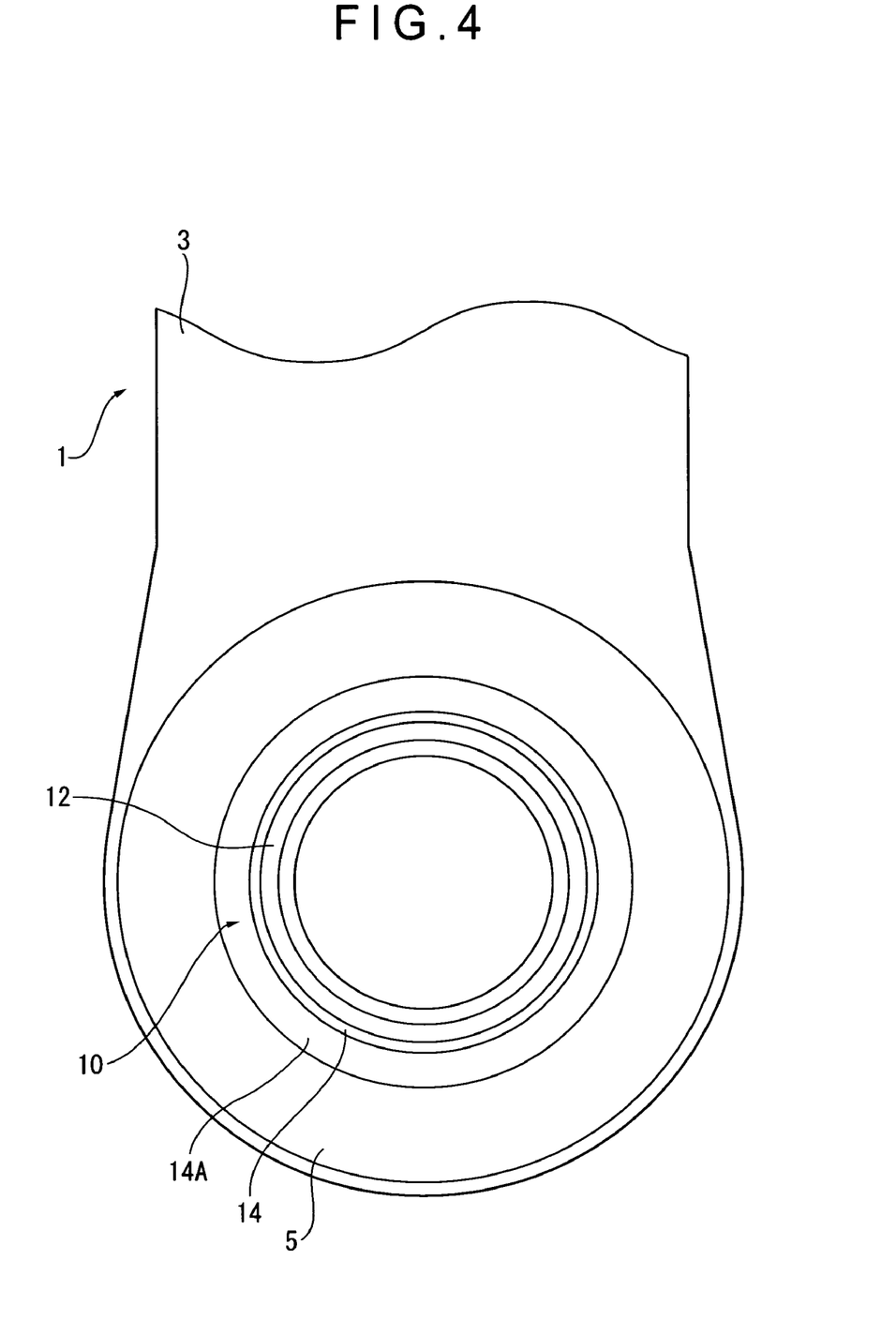

In FIGS. 3 and 4, the spherical slide bearing 10 is equipped with an outer ring 11 which is retained by the rocking side boss 5 and whose inner peripheral surface is formed as a concave spherical surface, and an inner ring 12 whose outer peripheral surface is formed as a convex spherical surface and which is fitted into the outer ring 11 to slide so as to allow rotational motion in an arbitrary direction. As shown also in FIG. 5, a gap 13 (FIG. 7) between the outer ring 11 and the inner ring 12 is sealed by annular seals 14 at both ends in the axial direction of the pin 20, and the seals 14 are retained by seal housings 14A. Further, in FIG. 5, a gap 15 (FIG. 7) between the inner ring 12 and the pin 20 inserted into it is also sealed by similar seals 16 at both ends in the axial direction of the pin 20, and the seals 16 are retained by seal housings 16A.

Figure 5:
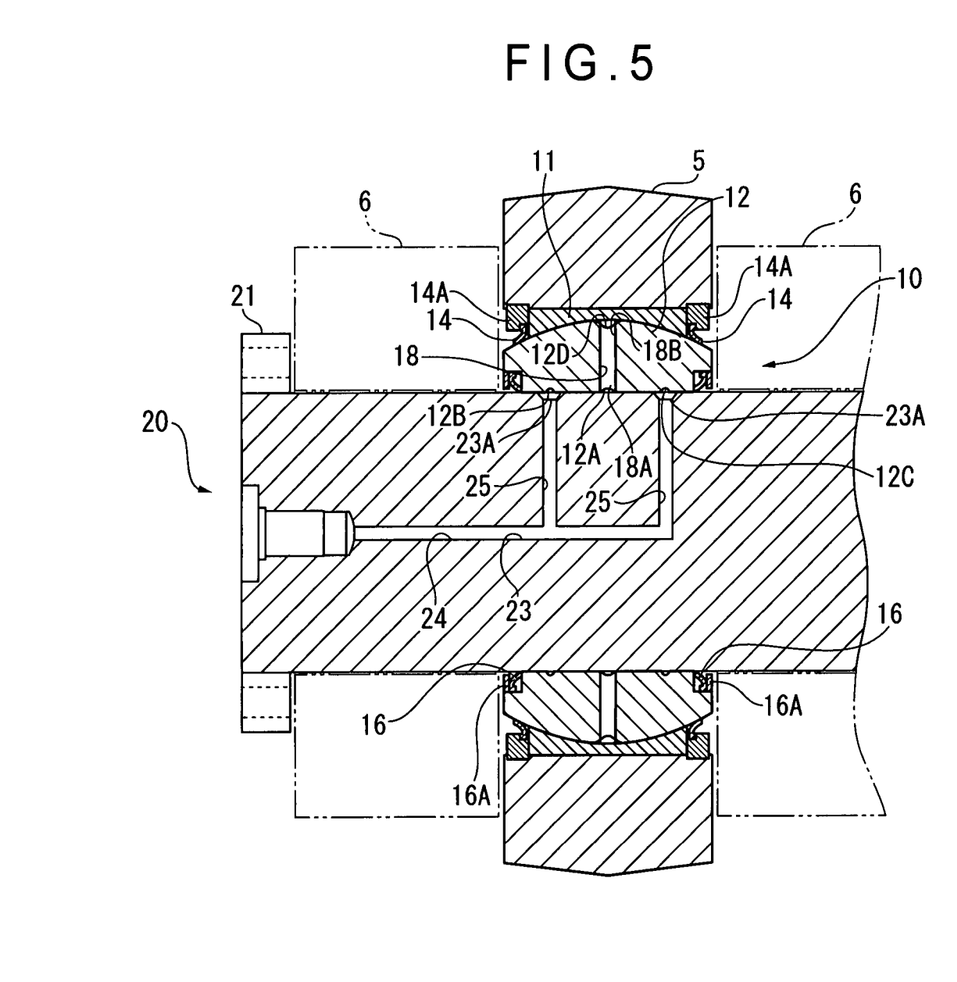

The seals 14 and 16 are formed of a synthetic resin such as polyurethane, and are, while different in diameter, of the same sectional configuration. In the large diameter seals 14, which seal the gap 13 between the outer ring 11 and the inner ring 12, the lips (inner peripheral edges) thereof are outwardly urged toward the outer side of the gap 13, thus reducing the resistance when grease is discharged from the gap 13. Conversely, in the small diameter seals 16, which seal the gap between the pin 20 and the inner ring 12, the lips (inner peripheral edges) thereof are urged toward the inner side of the gap 15, thereby suppressing leakage of grease from the gap 15. That is, the seals 16 function as leakage suppressing devices of the present invention.

In the inner peripheral surface of the inner ring 12, there are provided three circumferentially continuous grooves 12A, 12B, and 12C. Further, in the outer peripheral surface of the inner ring 12, a circumferential groove 12D is provided substantially at the center in the width direction along the axial direction of the pin 20.

Further, inside the inner ring 12, there are provided a plurality of (four in this embodiment) communication flow paths 18 arranged at equal circumferential intervals at positions corresponding to the central grooves 12A and 12D. The communication flow paths 18 are provided to extend radially through the inner ring, thereby establishing communication between the gap 15, which is between the pin 20 and the inner ring 12, and the gap 13, which is between the outer ring 11 and the inner ring 12. That is, inlet ports 18A of the communication flow paths 18 are open in the inner peripheral surface, and outlet ports 18B thereof are open in the outer peripheral surface; the grease flowing through the gap 15 between the pin 20 and the inner ring 12 flows in at the inlet ports 18A and flows out of the outlet ports 18B to be guided to the gap 13 between the outer ring 11 and the inner ring 12.

Figure 6:
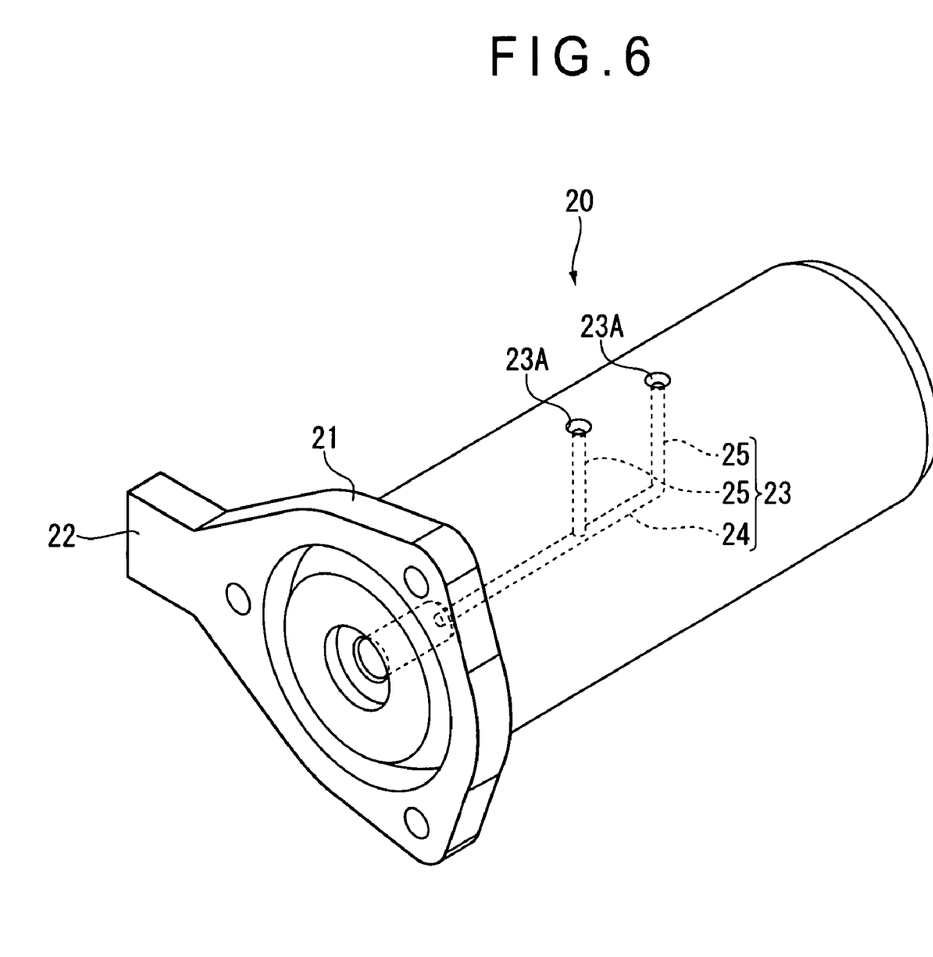

On the other hand, in FIGS. 5 and 6, inside the pin 20, there is provided a grease supply flow path 23 connected to an external grease supply line. The grease supply flow path 23 is formed by an introducing portion 24 along the axial direction, and a pair of branch portions 25 along a radial direction; outlet ports 23A of the grease supply flow path 23, which are the forward openings of the branch portions 25, are open in the outer peripheral surface of the pin 20, thereby making it possible to supply grease to the gap 15 between the pin 20 and the inner ring 12. Here, the pair of outlet ports 23A are provided at an axial interval so as to be in correspondence with the grooves 12B and 12C on both sides of the inner ring 12.

Figure 7:
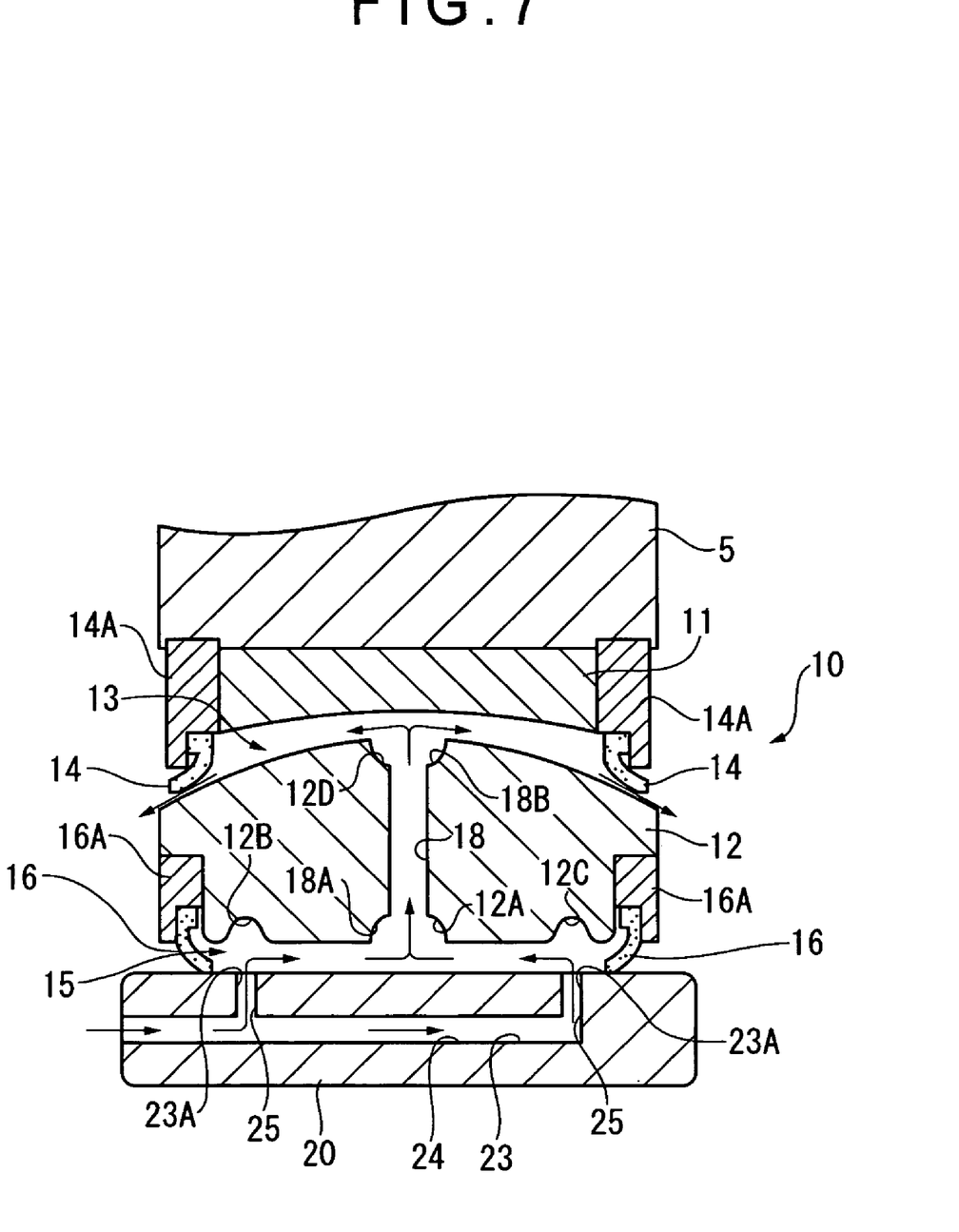

FIG. 7 schematically shows the above-mentioned spherical slide bearing 10 with the pin 20 inserted therein. In the drawing, the gaps 13, 15, etc. are depicted in an exaggerated fashion. Further, regarding the outer ring 11 and the inner ring 12, solely one side of each of them with respect to the central axis is shown. This also applies to FIGS. 9 and 10 referred to below.

As indicated by arrows in FIG. 7, grease supplied to the grease supply flow path 23 of the pin 20 flows from the introducing portion 24 through the branch portions 25 before entering the portions in the vicinity of both axial ends of the gap 15. The grease having entered the gap 15 passes first through the grooves 12B and 12C and flows in the circumferential direction of the gap 15; after filling the grooves 12B and 12C, the grease flows in the axial direction toward the center from both sides. The grease joins each other at the central groove 12A to fill the same, and further flows from the groove 12A to enter the communication flow path 18 at the inlet port 18A thereof.

That is, the grease flows through the gap 15 in the axial direction of the pin 20 through substantially the entire length thereof, and then flows into the communication flow paths 18 at the inlet ports 18A thereof; the positional relationship between the pair of outlet ports 23A of the grease supply flow path 23 and the inlet ports 18A of the communication flow paths 18 is determined such that the grease flows in the above-mentioned manner.

The grease flowing out of the outlet ports 18B of the communication flow paths 18 flows circumferentially along the groove 12D on the outer peripheral side; after filling the groove 12D, it flows toward both axial ends of the gap 13, thereby filling the interior of the gap 13. Any surplus grease resulting from excessive filling, or used grease forced out as a result of replenishment with new grease, is discharged to the exterior forcing its way under the seals 14 closing the gap 13.

This embodiment, constructed as described above, provides the following effects.

(1) In the spherical slide bearing 10 incorporated into the hydraulic cylinder 1, the pin 20 inserted is equipped with a pair of outlet ports 23A of the grease supply flow path 23 axially spaced apart from each other, and the inlet ports 18A of the communication flow paths 18 on the inner ring 12 side are provided at the center in the axial direction, so, after flowing through substantially the entire length in the axial direction of the gap 15, the grease flowing out of the outlet ports 23A can flow into the communication flow paths 18 at the inlet ports 18A, and within the gap 15, it is possible to eliminate portions where the filling with grease is insufficient or where used grease is allowed to stay, thereby preventing a deterioration in the grease in the gap 15. Thus, there is no fear of the communication flow paths 18 being clogged with deteriorated grease, and it is possible to spread grease also throughout the gap 13 between the outer ring 11 and the inner ring 12, thereby reliably preventing seizure of the sliding portions and achieving a substantial improvement in terms of durability.

(2) The lips of the seals 16 closing the gap 15 are urged toward the interior of the gap 15 so as to counteract the inner pressure on the inner side of the seals 16 in a satisfactory manner, thus reliably sealing the gap 15 and preventing leakage of grease. Thus, it is possible for the grease passing through the gap 15 to be reliably supplied to the gap 13 side through the communication flow paths 18.

(3) The seals 14 and 16 are made different from each other in sealing property by making different the directions in which their inner peripheral edges are urged, but their sectional configurations or the like are the same, so that it is only necessary to design the seals 14 and 16 according to the diameter dimension, thus facilitating the design of the seals. Further, since the seals 14 and 16 have the same sectional configuration, it is also possible to simplify the design of the seal housings 14A and 16A for retaining the seals.

The present invention is not restricted to the above-mentioned embodiment but also covers other constructions, etc. helping to achieve the object of the present invention; thus, the present invention also covers the following modifications, etc.

Second Embodiment

Figure 8:
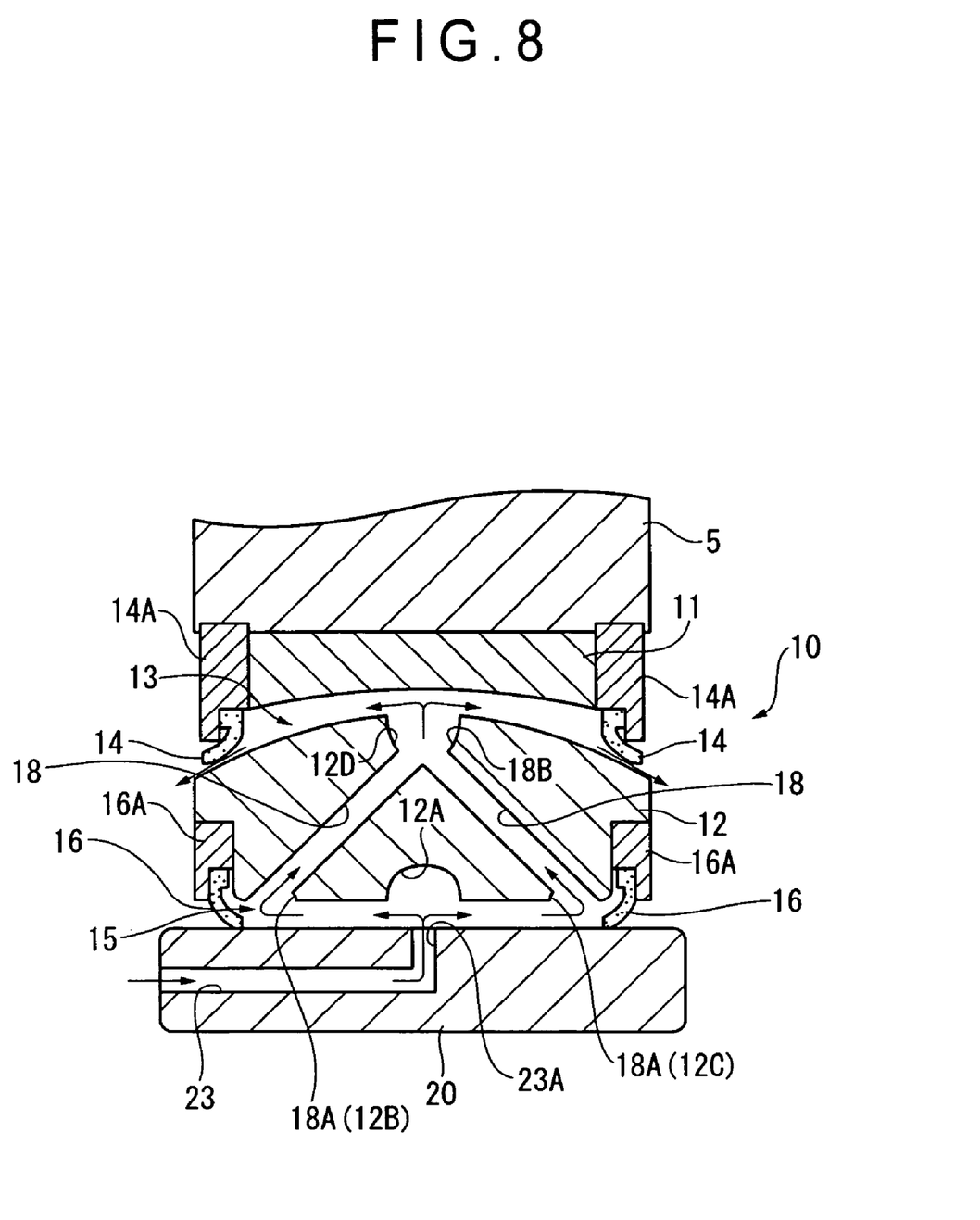

FIG. 8 shows a second embodiment of the present invention. The second embodiment is mainly different from the first embodiment in that the outlet port 23A of the grease supply flow path 23 is only provided at one position in correspondence with the groove 12A substantially at the center in the width direction of the inner ring 12 along the axial direction of the pin 20, and that each communication flow path 18 is composed of two lines whose inlet ports 18A are at both ends in the width direction of the inner ring 12 along the axial direction of the pin 20, with the two lines of each communication flow path 18 joining each other at the outlet port 18B provided in correspondence with the groove 12D. A plurality of (e.g., four) such communication flow paths 18 are provided at equal circumferential intervals.

In the second embodiment, constructed as described above, grease flows into the gap 15 between the pin 20 and the inner ring 12 from the center in the axial direction to fill the groove 12A, and then flows to both sides from the groove 12A, flowing through the gap 15 through substantially the entire length in the axial direction thereof. Then, the grease flows into the communication flow paths 18 at the inlet ports 18A at both ends of the gap 15, and flows to the gap 13 side through the communication flow paths 18. On the gap 13 side, the flows of grease first join each other at the outlet ports 18B before flowing circumferentially along the groove 12D. After that, as in the first embodiment, the grease flows to both sides from the groove 12D to fill the gap 13.

With the above-mentioned construction, within the gap 15, grease flows through the entire length in the axial direction thereof, thereby making it possible to prevent a deficiency in filling and stagnation of grease and to prevent a deterioration thereof. Thus, it is possible to prevent clogging of the communication flow paths 18 with deteriorated grease and insufficient filling of the gap 13, thereby making it possible, as in the first embodiment, to lubricate the sliding portions in a satisfactory manner and to achieve an improvement in terms of durability.

Further, due to the same construction as that of the first embodiment, it is possible to obtain the same effect as that described in the first embodiment.

Third Embodiment

Figure 9:
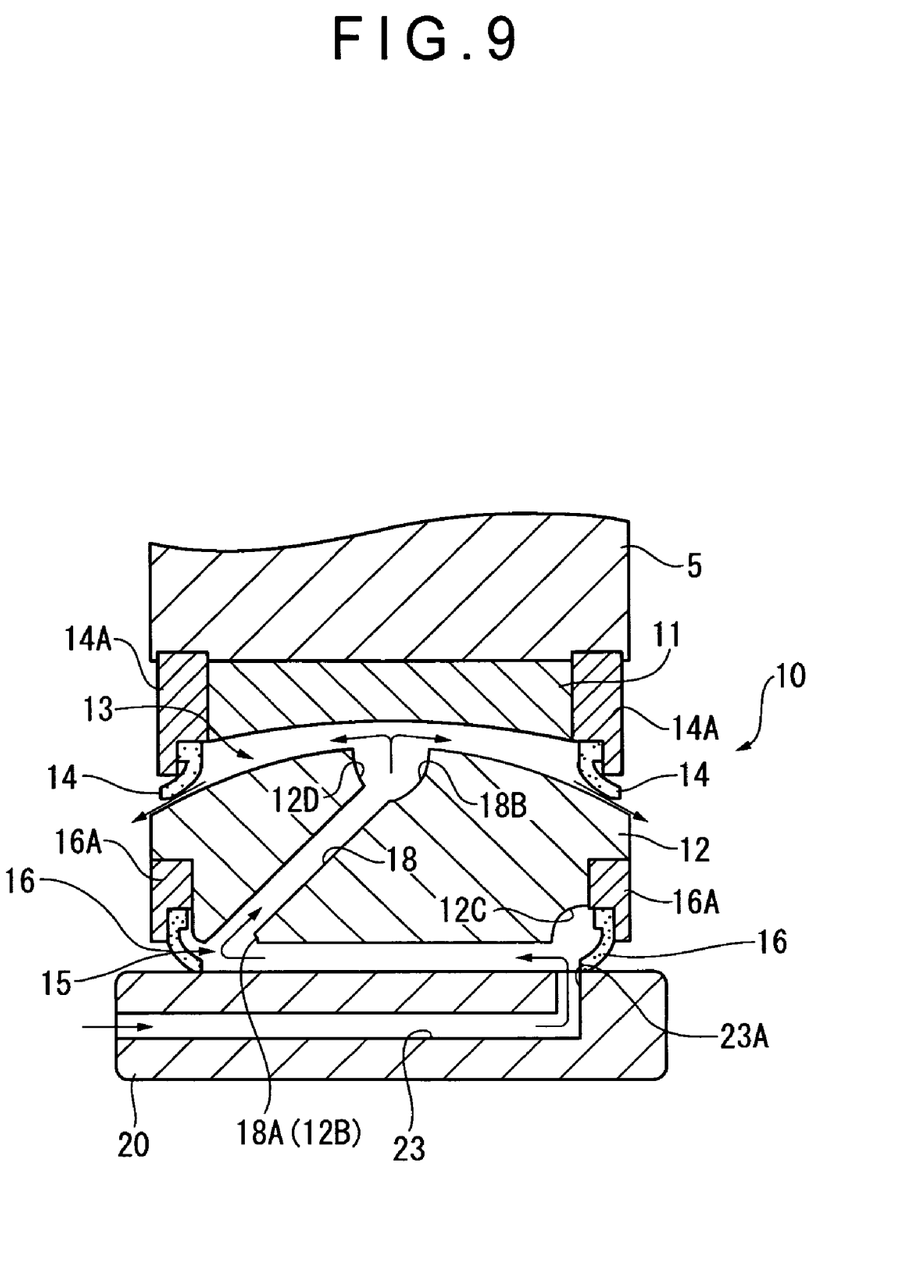

FIG. 9 shows a third embodiment of the present invention. The third embodiment mainly differs from the first embodiment and the second embodiment in that the outlet port 23A of the grease supply flow path 23 is provided solely on one side of the gap 15 with respect to the width direction of the inner ring 12 along the axial direction of the pin 20, that is, solely at one position in correspondence with the groove 12C of the inner ring 12, and that the inlet port 18A of each communication flow path 18 is provided on the opposite side of the outlet port 23A of the grease supply flow path 23 with respect to the width direction of the inner ring 12 along the axial direction of the pin 20.

In the third embodiment, grease enters at one end (one axial end) of the gap 15 and flows toward the other end to flow through substantially the entire length thereof. After that, it flows through the communication flow paths 18 from the other end to flow out of the center of the gap 13 and fills the groove 12D before filling the entire gap 13.

Also in the third embodiment, constructed as described above, it is possible to prevent insufficient filling and stagnation of grease in the gap 15, so that the same effect as that of the first embodiment and the second embodiment can be obtained, thus making it possible to achieve the object of the present invention.

Fourth Embodiment

Figure 10:
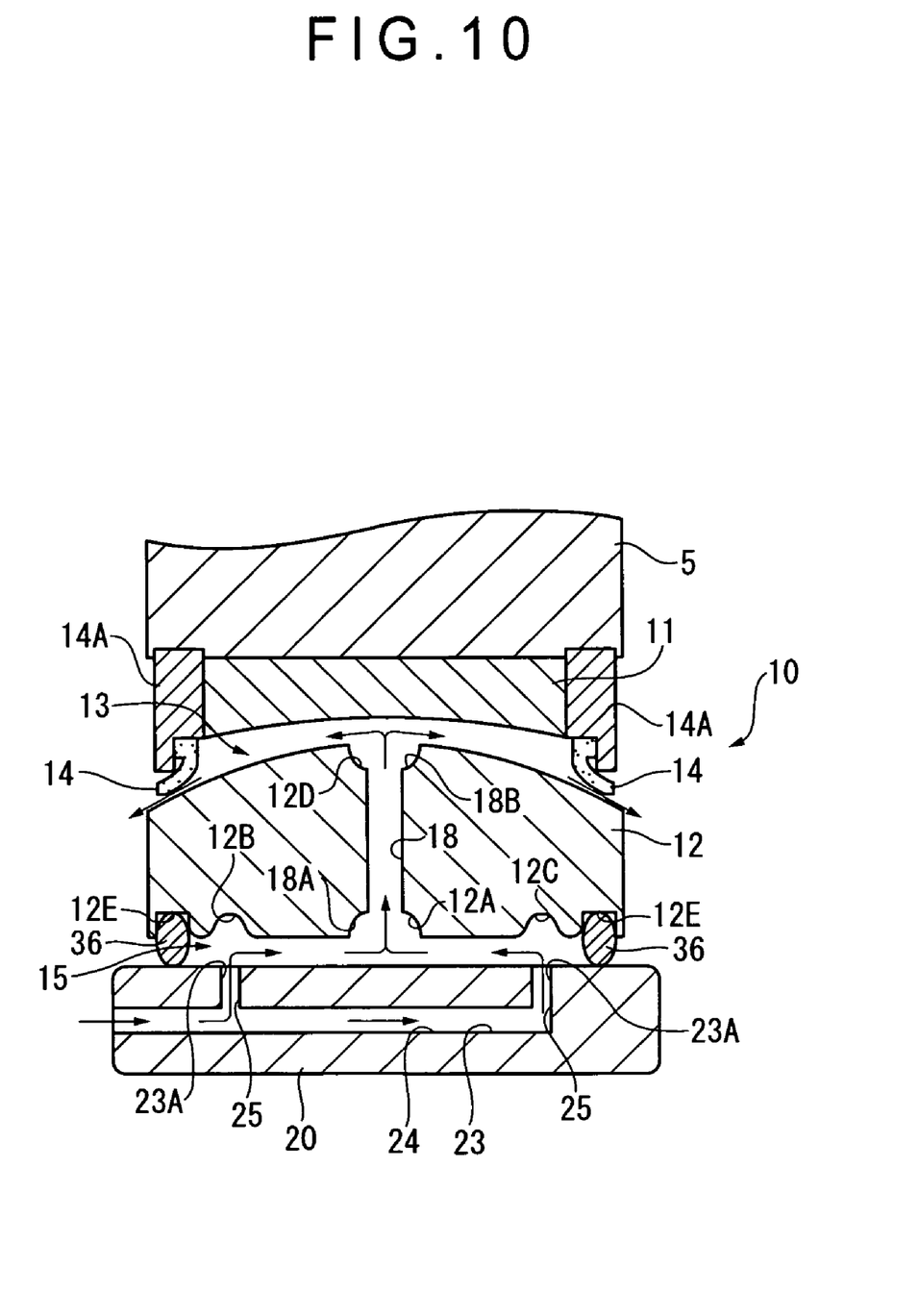

FIG. 10 shows the fourth embodiment of the present invention. As shown in FIGS. 7 through 9, in the first through third embodiments, the lip-like seals 16 are provided at the lower ends of the seal housings 16A, and the seals 16 function as the leakage suppressing devices of the present invention.

In contrast, in the fourth embodiment, ring-like grooves 12E are formed in the inner peripheral surface of the inner ring 12 opposed to the pin 20, and O-rings 36 are fitted into the grooves 12E, with the O-rings 36 functioning as the leakage preventing devices. As the material of the O-rings 36, it is desirable to adopt an elastic material such as NBR of an NBR hardness of 30° or more; apart from NBR, it is also possible to adopt silicone rubber, fluororubber, etc.

In the fourth embodiment, constructed as described above, it is possible to obtain the same effect as that of the first embodiment. Further, since the leakage preventing devices with the very simple structures of the O-rings 36 can be formed, it is possible to simplify the construction of the spherical slide bearing system.

Other Modifications

The grease leakage preventing device of the present invention is not restricted to the seals 16 as described in connection with the first embodiment; for example, it is also possible to provide diaphragms diminishing the clearance amount of the gap 15 on both sides in the axial direction of the gap 15, using the diaphragms as the leakage suppressing devices. In brief, it is possible to adopt any construction of an arbitrary configuration, etc. as long as the construction helps to suppress grease leakage from the gap 15 and reliably allows grease to flow from the gap 15 to the gap 13 side through the communication flow paths 18.

Even when seals are used as the leakage suppressing devices, it is not necessary for their sectional configuration, etc. to be the same as those of the seals 14 closing the gap 13 as in the first embodiment; they may be determined as appropriate in carrying out the invention. However, it is desirable for the sectional configurations to be the same since it helps to obtain the above-mentioned effect.

Further, the spherical slide bearing of the present invention is not restricted to one to be incorporated into the hydraulic cylinder 1 of construction equipment; the bearing can be incorporated into an arbitrary member in which it is necessary to permit inclination with respect to a pin.

The above-mentioned most preferred construction, method, etc. for carrying out the present invention should not be construed restrictively. That is, the specific embodiments of the present invention shown and described above allow various modifications by those skilled in the art in terms of configuration, amount, and other details without departing from the technical idea and object of the present invention.

Thus, the above description, in which specifications are given in terms of configuration, amount, etc., has only been given by way of example in order to facilitate the understanding of the present invention, and is to be by no means construed restrictively. Accordingly, any description of components referred to without any such restriction, partially or entirely, in terms of configuration, amount, etc. is to be covered by the scope of the present invention.

Apart from construction equipment, the present invention is also suitable for use in various industrial machines, base-isolation structure portions of buildings, etc.

The invention claimed is:

1. A spherical slide bearing system, comprising:
   an outer ring;
   an inner ring slidably retained within the outer ring; and
   a pin having a grease supply flow path extending through an interior thereof to open in an outer peripheral surface thereof, the pin being inserted into the inner ring so that the pin is circumferentially slidable therein, and the inner ring including a communication flow path establishing communication between a gap defined between the inner ring and the pin and a gap defined between the inner ring and the outer ring;
   wherein each of at least one inlet port of the communication flow path in the inner ring is provided at a position that is axially displaced from each of at least one outlet port of the grease supply flow path in the pin so that grease flows through the gap between the pin and the inner ring substantially along an entire axial length of the pin after flowing out of the at least one outlet port of the grease supply flow path and before flowing into the at least one inlet port of the communication flow path.

2. The spherical slide bearing system according to claim 1, further comprising leakage suppressing devices for suppressing leakage of grease from the gap between the pin and the inner ring arranged at both ends of the gap between the pin and the inner ring, with respect to an axial direction of the pin.

3. The spherical slide bearing system according to claim 2, wherein a circumferentially continuous groove is provided at a portion of an inner peripheral surface of the inner ring corresponding to each of the at least one outlet port of the grease supply flow path.

4. The spherical slide bearing system according to claim 2, wherein an outlet port of the communication flow path is provided substantially at a central portion of an outer peripheral surface of the inner ring with respect to a width direction thereof along the axial direction of the pin.

5. The spherical slide bearing system according to claim 2, wherein the at least one outlet port of the grease supply flow path comprises two outlet ports each arranged in a vicinity of a respective end in a width direction of the inner ring along the axial direction of the pin and within a width of the inner ring so that the two outlet ports of the grease supply flow path are substantially symmetrical with respect to a center in the width direction, and wherein the at least one inlet port of the communication flow path comprises a single inlet port arranged substantially at a central portion in the width direction of the inner peripheral surface of the inner ring.

6. The spherical slide bearing system according to claim 2, wherein the at least one outlet port of the grease supply flow path comprises a single outlet port arranged substantially at a central portion in a width direction of the inner ring along the axial direction of the pin, and wherein the at least one inlet port of the communication flow path comprises two inlet ports each arranged in a vicinity of a respective end in the width direction of an inner peripheral surface of the inner ring.

7. The spherical slide bearing system according to claim 2, wherein the at least one outlet port of the grease supply flow path comprises a single outlet port arranged in a vicinity of one end in a width direction of the inner ring along the axial direction of the pin and within the width of the inner ring, and wherein the at least one inlet port of the communication flow path comprises a single inlet port arranged in a vicinity of the other end in the width direction of the inner peripheral surface of the inner ring.

8. The spherical slide bearing system according to claim 1, wherein a circumferentially continuous groove is provided at a portion of an inner peripheral surface of the inner ring corresponding to each of the at least one outlet port of the grease supply flow path.

9. The spherical slide bearing system according to claim 1, wherein an outlet port of the communication flow path is provided substantially at a central portion of an outer peripheral surface of the inner ring with respect to a width direction thereof along an axial direction of the pin.

10. The spherical slide bearing system according to claim 1, wherein the at least one outlet port of the grease supply flow path comprises two outlet ports each arranged in a vicinity of a respective end in a width direction of the inner ring along an axial direction of the pin and within a width of the inner ring so that the two outlet ports of the grease supply flow path are substantially symmetrical with respect to a center in the width direction, and wherein the at least one inlet port of the communication flow path comprises a single inlet port arranged substantially at a central portion in the width direction of the inner peripheral surface of the inner ring.

11. The spherical slide bearing system according to claim 1, wherein the at least one outlet port of the grease supply flow path comprises a single outlet port arranged substantially at a central portion in a width direction of the inner ring along an axial direction of the pin, and wherein the at least one inlet port of the communication flow path comprises two inlet ports each arranged in a vicinity of a respective end in the width direction of an inner peripheral surface of the inner ring.

12. The spherical slide bearing system according to claim 1, wherein the at least one outlet port of the grease supply flow path comprises a single outlet port arranged in a vicinity of one end in a width direction of the inner ring along an axial direction of the pin and within the width of the inner ring, and wherein the at least one inlet port of the communication flow path comprises a single inlet port arranged in a vicinity of the other end in the width direction of the inner peripheral surface of the inner ring.

* * * * *